US012746808B2

(12) United States Patent
Balding et al.

(10) Patent No.: US 12,746,808 B2
(45) Date of Patent: Sep. 29, 2026

(54) BATTERY SYSTEM MOUNTING APPARATUS FOR A VEHICLE

(71) Applicant: GM Global Technology Operations LLC, Detroit, MI (US)

(72) Inventors: Andrew Geoffrey Balding, Wixom, MI (US); Damion Creffield, Manchester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 272 days.

(21) Appl. No.: 18/592,770

(22) Filed: Mar. 1, 2024

(65) Prior Publication Data

US 2025/0276568 A1 Sep. 4, 2025

(51) Int. Cl.

| | |
|---|---|
| ***H01M 50/24*** | (2021.01) |
| ***B60K 1/04*** | (2019.01) |
| ***B60R 16/03*** | (2006.01) |
| ***B60R 16/08*** | (2006.01) |
| ***B62D 25/20*** | (2006.01) |
| ***B62D 25/24*** | (2006.01) |
| ***H01M 50/209*** | (2021.01) |
| ***H01M 50/249*** | (2021.01) |
| ***H01M 50/262*** | (2021.01) |

(52) U.S. Cl.

CPC ................ *B60K 1/04* (2013.01); *B60R 16/03* (2013.01); *B60R 16/08* (2013.01); *B62D 25/20* (2013.01); *B62D 25/24* (2013.01); *H01M 50/209* (2021.01); *H01M 50/24* (2021.01); *H01M 50/249* (2021.01); *H01M 50/262* (2021.01); *B60K 2001/0438* (2013.01); *H01M 2220/20* (2013.01)

(58) Field of Classification Search

CPC .............. B60K 1/04; B60K 2001/0438; B60K 2001/0472; B60K 2001/0455; B60R 16/03; B60R 16/08; B62D 25/20; B62D 25/24; H01M 50/209; H01M 50/24; H01M 50/249; H01M 50/262; H01M 2220/20; B60L 50/64

See application file for complete search history.

(56) References Cited

U.S. PATENT DOCUMENTS

| | | | | |
|---|---|---|---|---|
| 10,632,857 | B2 * | 4/2020 | Matecki | B60L 50/64 |
| 11,637,346 | B2 * | 4/2023 | Kaita | H01M 50/249 180/68.5 |

FOREIGN PATENT DOCUMENTS

| | | | | |
|---|---|---|---|---|
| CN | 106794751 B | * 10/2019 | | B60L 50/66 |
| CN | 113665684 A | * 11/2021 | | B60K 1/04 |
| CN | 216120549 U | * 3/2022 | | H01M 50/209 |
| CN | 116805746 A | * 9/2023 | | H01M 50/262 |
| DE | 102011017459 A1 | 10/2012 | | |
| DE | 102014203505 A1 | 9/2014 | | |
| DE | 102016103371 A1 | 9/2016 | | |
| DE | 102016103906 A1 | 9/2016 | | |
| DE | 102017213122 A1 | 3/2018 | | |

(Continued)

*Primary Examiner* — Justin Holmes

(74) *Attorney, Agent, or Firm* — Vivacqua Crane, PLLC

(57) ABSTRACT

An apparatus for affixing a battery system component to a vehicle may include a mounting plate configured to be removably affixed to the vehicle. The battery system component is affixed to the mounting plate. The apparatus further may include a mounting plate hanger affixed to the mounting plate. The mounting plate hanger is configured to be removably affixed to the vehicle.

18 Claims, 6 Drawing Sheets

(56) References Cited

FOREIGN PATENT DOCUMENTS

| | | | |
|---|---|---|---|
| DE | 102020133961 | A1 | 6/2022 |
| EP | 2905160 | A1 | 8/2015 |

* cited by examiner

BATTERY SYSTEM MOUNTING APPARATUS FOR A VEHICLE

INTRODUCTION

The present disclosure relates to an apparatus and system for mounting battery system components to a vehicle.

To increase performance and ease of manufacturing, battery powered electric vehicles and hybrid electric vehicles may be equipped with battery storage systems which are configured to provide electrical energy to power electromechanical components and systems of the vehicle. Battery storage systems may be packaged in a sealed container to provide structure and environmental/electrical isolation for the battery system. However, current battery storage systems may be large and heavy, requiring specialized equipment for installation to the vehicle during vehicle manufacturing. Additionally, current battery storage systems may require removal of the entire storage system from the vehicle in order to perform service and/or maintenance of the battery system. Furthermore, current battery system packaging apparatuses may require significant modification to vehicle structure in order to accommodate the large and/or heavy container.

Thus, while current battery packaging systems and apparatuses achieve their intended purpose, there is a need for a new and improved system and apparatus for affixing a battery system component to a vehicle.

SUMMARY

According to several aspects, an apparatus for affixing a battery system component to a vehicle is provided. The apparatus may include a mounting plate configured to be removably affixed to the vehicle. The battery system component is affixed to the mounting plate. The apparatus further may include a mounting plate hanger affixed to the mounting plate. The mounting plate hanger is configured to be removably affixed to the vehicle.

In another aspect of the present disclosure, the mounting plate further may include one or more attachment features configured to be affixed to the vehicle using a removable fastener.

In another aspect of the present disclosure, the one or more attachment features are affixed to a vehicle body cross member of the vehicle using the removable fastener.

In another aspect of the present disclosure, the battery system component further may include a battery module including one or more battery cells.

In another aspect of the present disclosure, the battery system component further may include a battery disconnect unit (BDU).

In another aspect of the present disclosure, the mounting plate hanger further may include a rigid support member affixed to the mounting plate and removably affixed to the vehicle.

In another aspect of the present disclosure, the rigid support member further may include a first end affixed to the mounting plate. The rigid support member further may include a second end affixed to the vehicle using a removable fastener. The second end is opposite the first end.

In another aspect of the present disclosure, the rigid support member further may include a trapezoidal rigid support member. The first end of the trapezoidal rigid support member is affixed to the mounting plate and the second end of the trapezoidal rigid support member is affixed to a vehicle body floor pan of the vehicle using a removable fastener.

In another aspect of the present disclosure, the vehicle body floor pan further may include an access panel providing access to the battery system component.

In another aspect of the present disclosure, the apparatus further may include a liner disposed between the battery system component and the vehicle. The liner is configured to isolate the battery system component from the vehicle.

According to several aspects, a system for affixing a battery system component to a vehicle is provided. The system may include a vehicle body including a vehicle body floor pan having a first surface and a second surface. The first surface is parallel to the second surface. The vehicle body further may include a plurality of vehicle body cross members, each of the plurality of vehicle body cross members having a first end, a second end, and a first surface. The first end of each of the plurality of the vehicle body cross members is affixed to the second surface of the vehicle body floor pan such that the first surface of each of the plurality of vehicle body cross members is substantially perpendicular to the second surface of the vehicle body floor pan. The system further may include a mounting module removably affixed between two of the plurality of vehicle body cross members, the mounting module including a mounting plate having a first surface. The mounting module further may include a mounting plate hanger having a first end and a second end. The first end is affixed to the first surface of the mounting plate. The second end is configured to be removably affixed to the second surface of the vehicle body floor pan. The system further may include the battery system component affixed to the first surface of the mounting plate.

In another aspect of the present disclosure, each of the plurality of vehicle body cross members further may include one or more penetrations in the first surface of each of the plurality of vehicle body cross members. Each of the one or more penetrations allows for passage of one or more electrical or fluid conductors for electrical or fluid connection to the battery system component.

In another aspect of the present disclosure, the vehicle body floor pan further may include one or more access panels disposed on the first surface of the vehicle body floor pan. The one or more access panels provide access to the one or more electrical or fluid conductors.

In another aspect of the present disclosure, the mounting plate further may include one or more attachment features configured to be affixed to the second end of one or more of the plurality of vehicle body cross members using removable fasteners.

In another aspect of the present disclosure, the mounting plate hanger further may include a trapezoidal rigid support member. A first end of the trapezoidal rigid support member is affixed to the first surface of the mounting plate and a second end of the trapezoidal rigid support member is affixed to the second surface of the vehicle body floor pan using a removable fastener.

In another aspect of the present disclosure, the battery system component further may include at least one of: (i) a battery module including one or more battery cells, and (ii) a battery disconnect unit (BDU).

In another aspect of the present disclosure, the system further may include a liner disposed between the battery system component and the vehicle body. The liner is configured to isolate the battery system component from the vehicle body.

According to several aspects, an apparatus for affixing a battery system component to a vehicle is provided. The apparatus may include a mounting module including a mounting plate having a first surface. The battery system component is affixed to the first surface. The apparatus further may include a mounting plate hanger having a first end and a second end. The first end is affixed to the first surface of the mounting plate. The second end is configured to be removably affixed to a vehicle body floor pan.

In another aspect of the present disclosure, the mounting plate hanger further may include a trapezoidal rigid support member. A first end of the trapezoidal rigid support member is affixed to the first surface of the mounting plate and a second end of the trapezoidal rigid support member is affixed to the vehicle body floor pan using a removable fastener.

In another aspect of the present disclosure, the mounting module further may include at least two mounting plate hangers affixed to the first surface of the mounting plate. The battery system component is disposed between the at least two mounting plate hangers on the first surface of the mounting plate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, a new and improved battery storage system for battery electric vehicles (BEVs), plug-in hybrid electric vehicles (PHEVs), and/or hybrid electric vehicles (HEVs) is provided. The battery storage system is packaged to provide structure and environmental/electrical isolation. Advantageously, the new and improved battery storage system of the present disclosure adds less weight to the vehicle. This is because the new and improved battery storage system of the present disclosure utilizes existing vehicle structure to provide structure to the battery storage system. This is in contrast to conventional sealed battery containers that are larger and heavier, requiring specialized equipment and skill for installation during vehicle assembly and removal/re-installation during maintenance. Furthermore, use of sealed battery containers may require re-design of vehicle body structure in order to accommodate the size, shape, and weight of such sealed battery containers. Accordingly, the present disclosure provides a new and improved battery storage system having a modular design for affixing batteries and battery system components to a vehicle.

Figure 1:
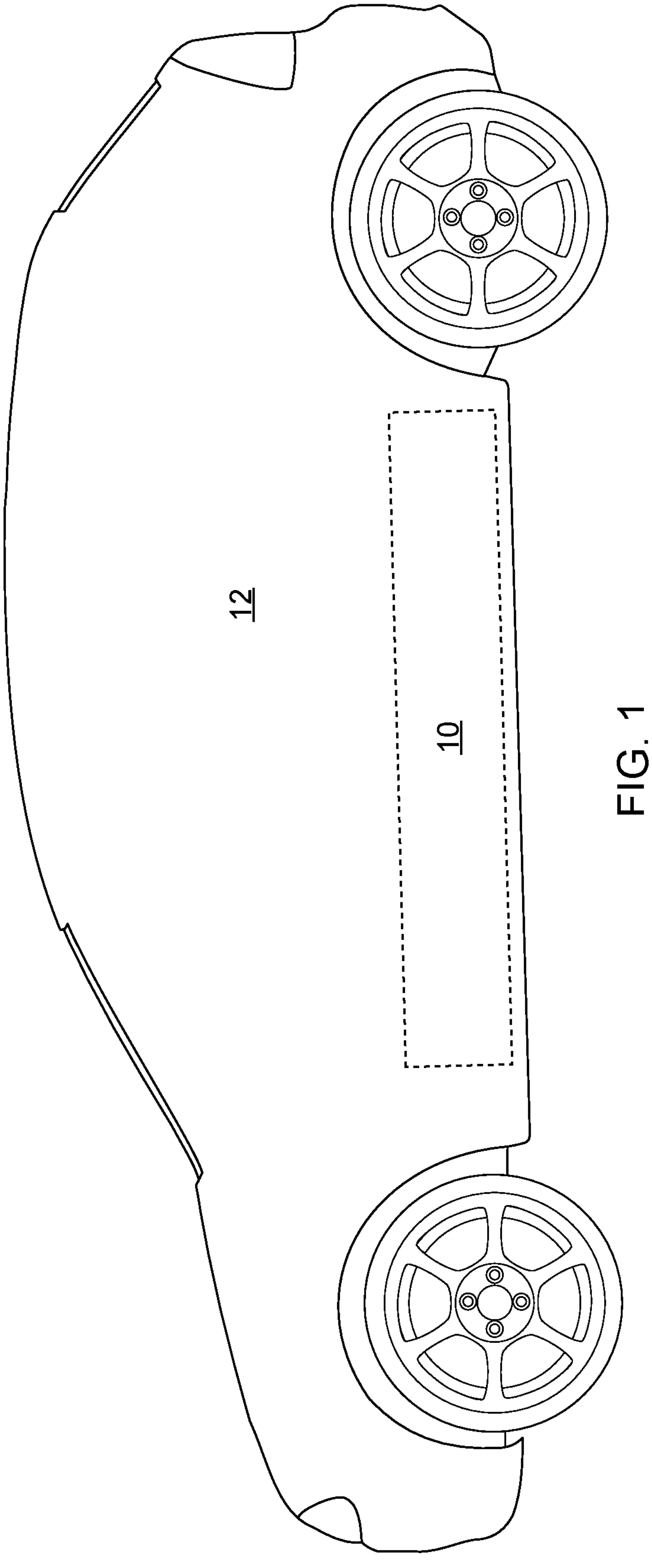
FIG. 1 is a schematic diagram of a system for affixing a battery system component to a vehicle, according to an exemplary embodiment.

Referring to FIG. 1, a schematic diagram of a system for affixing a battery system component to a vehicle is illustrated and generally indicated by reference number 10. The system 10 is shown with a cutaway view of an exemplary vehicle 12. While a passenger vehicle is illustrated, it should be appreciated that the vehicle 12 may be any type of vehicle without departing from the scope of the present disclosure. In an exemplary embodiment, the system 10 is disposed on an underside of the vehicle 12. More particularly, the system 10 is integrated with a body of the vehicle 12, as will be discussed in greater detail below.

Figure 2:
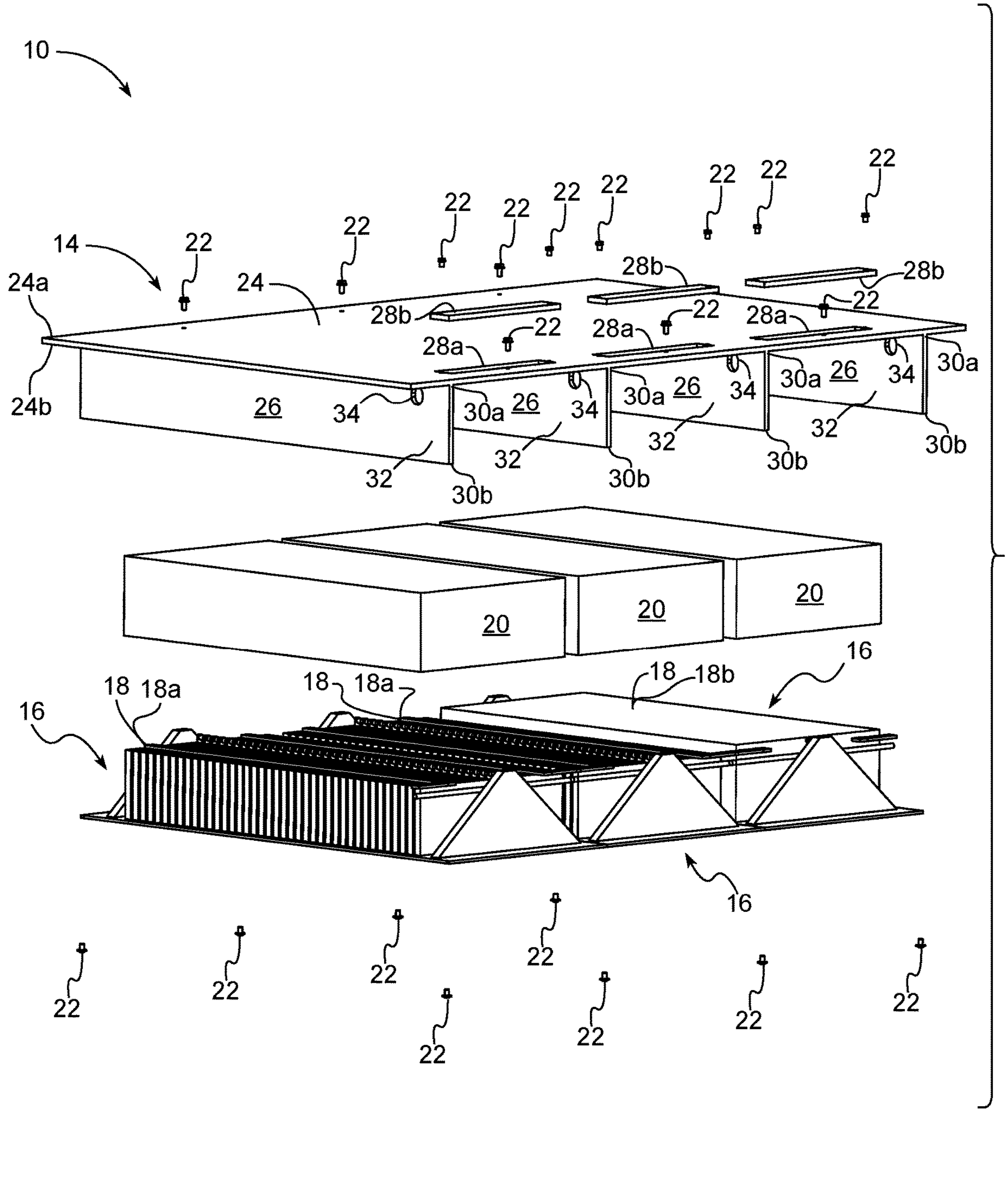
FIG. 2 is an exploded perspective view of the system for affixing a battery system component to a vehicle, according to an exemplary embodiment.
Figure 3:
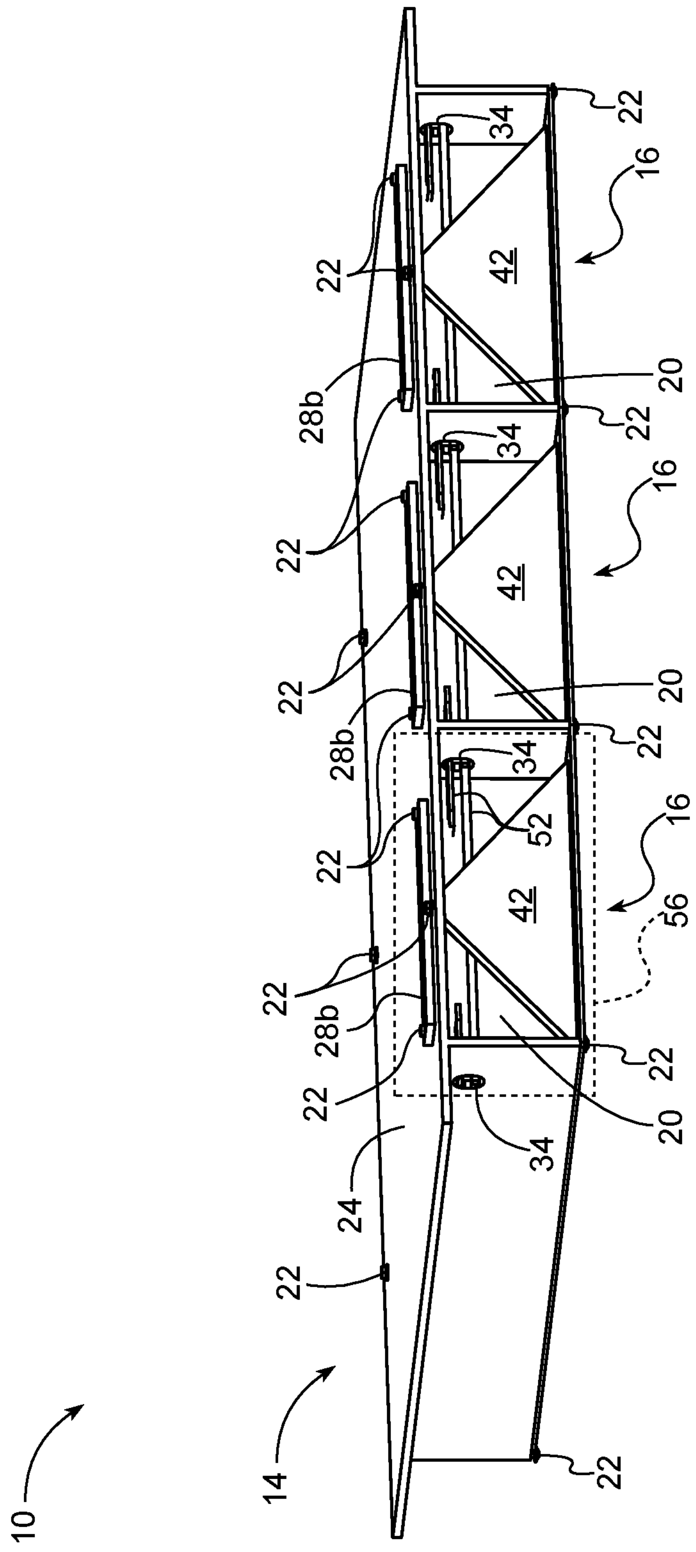
FIG. 3 is an assembled perspective view of the system for affixing a battery system component to a vehicle, according to an exemplary embodiment.
Figure 4:
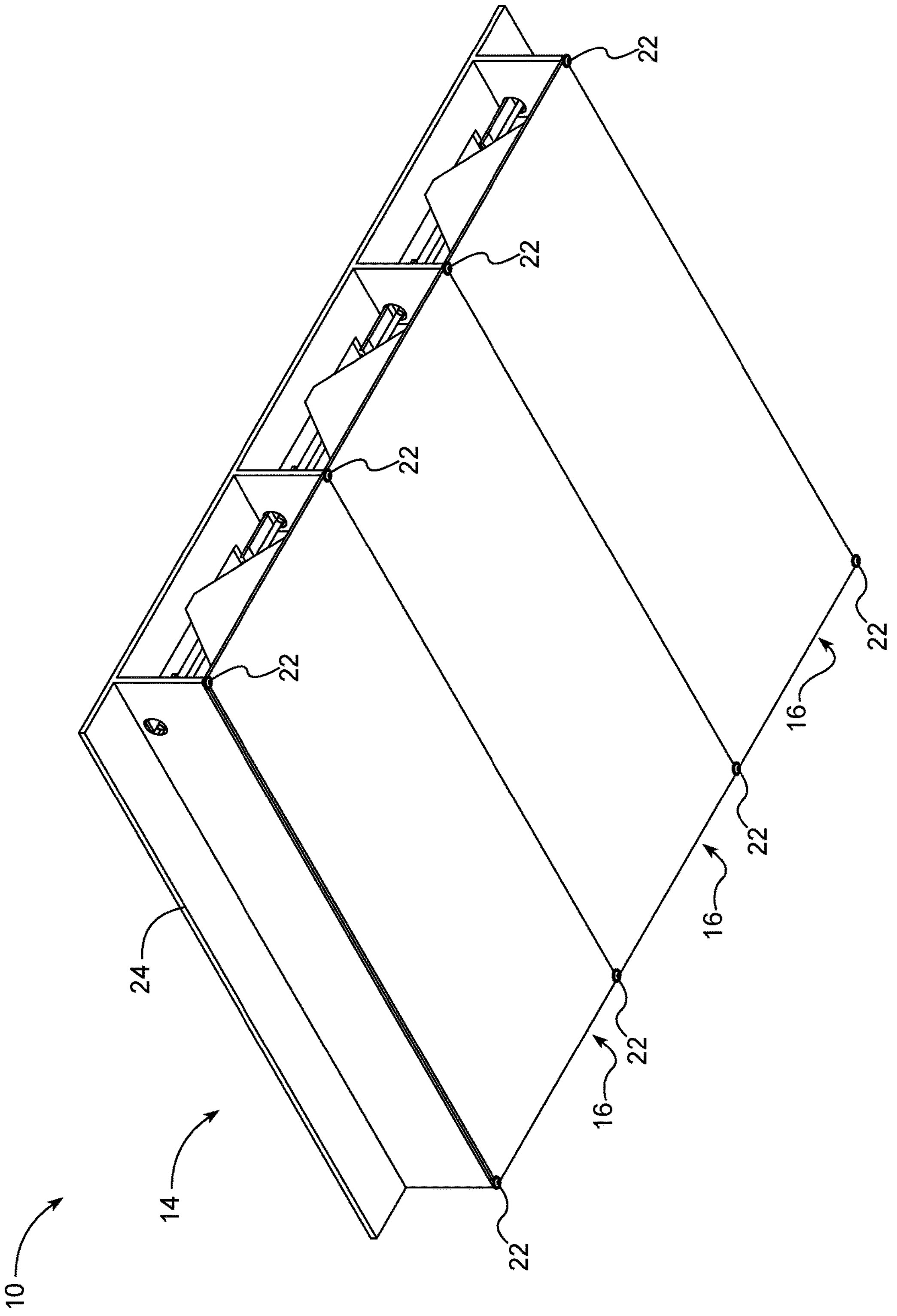
FIG. 4 is an assembled bottom perspective view of the system for affixing a battery system component to a vehicle, according to an exemplary embodiment.

Referring now to FIGS. 2-4, an exploded perspective view of the system 10 is shown in FIG. 2, an assembled perspective view of the system 10 is shown in FIG. 3, and an assembled bottom perspective view of the system 10 is shown FIG. 4. The system 10 generally includes a vehicle body 14, a mounting module 16, a battery system component 18, and a liner 20. While FIGS. 2-4 show an embodiment including three mounting modules 16, three battery system components 18, and three liners 20, it should be understood that embodiments including any number of mounting modules 16, battery system components 18, and liners 20 are within the scope of the present disclosure. Furthermore, the system 10 is shown with a plurality of fasteners 22. In the scope of the present disclosure, the plurality of fasteners 22 includes removable fasteners, such as, for example, screws, bolts, and/or the like. The plurality of fasteners 22 are configured to engage with nuts, threads, and/or the like to form a removable affixture between two objects. It should be understood that the location, type, and size of the plurality of fasteners 22 shown in FIGS. 2-4 are merely exemplary in nature, and that FIGS. 2-4 are not necessarily to scale.

The vehicle body 14 includes a vehicle body floor pan 24 and a plurality of vehicle body cross members 26. The vehicle body floor pan 24 provides structure to the vehicle body 14 and provides a floor surface for an interior of the vehicle 12. Interior components of the vehicle 12 (e.g., seats of the vehicle 12) may be mounted to the vehicle body floor pan 24. In an exemplary embodiment, the vehicle floor pan 24 has a first surface 24*a* and a second surface 24*b*. The first surface 24*a* of the vehicle body floor pan 24 faces the interior of the vehicle 12 and the second surface 24*b* faces an exterior of the vehicle 12. In an exemplary embodiment, the vehicle body floor pan 24 is penetrated by a plurality of access ports 28*a* allowing access from the first surface 24*a* (i.e., the interior of the vehicle 12) to the battery system component 18, as will be discussed in greater detail below. The vehicle body floor pan 24 further may include a plurality of access panels 28*b* disposed on the first surface 24*a* to cover the plurality of access ports 28*a*. In a non-limiting example, the plurality of access panels **28*b* are removably affixed with the fasteners 22. In an exemplary embodiment, the fasteners 22 holding the plurality of access panels 28*b* may be removed from the first surface 24*a* (i.e., the interior of the vehicle 12). In another exemplary embodiment, the fasteners 22 holding the plurality of access panels 28*b* may be removed from the second surface 24*b* (i.e., the exterior of the vehicle 12). It should be understood that the quantity, size, shape, and location of the plurality of the access ports 28*a* and the access panels 28*b* shown in FIGS. 2-4 are merely exemplary in nature, and that FIGS. 2-4 are not necessarily to scale. In a non-limiting example, the vehicle body floor pan 24** is made of a sheet metal and/or composite material (e.g., steel, aluminum, carbon fiber, and/or the like).

The plurality of vehicle body cross members 26 provide additional structural support to the vehicle body floor pan 24. In an exemplary embodiment, each vehicle body cross member 26 has a first end **30*a*, a second end 30*b*, and a first surface 32. In a non-limiting example, the first end 30*a* of each vehicle body cross member 26 is affixed to the second surface 24*b* of the vehicle body floor pan 24 such that the first surface 32 of each vehicle body cross member 26 is substantially perpendicular to the second surface 24*b* of the vehicle body floor pan 24. In the scope of the present disclosure, substantially perpendicular means that an angle measured between the first surface 32 of each vehicle body cross member 26 and the second surface 24*b* of the vehicle body floor pan 24** is approximately ninety degrees (90°) within a predetermined tolerance (e.g., ±10%).

In a non-limiting example, the first end **30*a* is affixed to the second surface 24*b* of the vehicle body floor pan 24 using a weld, an angled bracket and fasteners, and/or the like. In an exemplary embodiment, each vehicle body cross member 26 has one or more penetrations 34 in at least the first surface 32 of each vehicle body cross member 26 allowing for connection to the battery system component 18, as will be discussed in greater detail below. It should be understood that the quantity, size, shape, and location of the one or more penetrations 34 shown in FIGS. 2-4 are merely exemplary in nature, and that FIGS. 2-4 are not necessarily to scale. It should be understood that the quantity, size, shape, and location of the plurality of vehicle body cross members 26 shown in FIGS. 2-4 are merely exemplary in nature. In a non-limiting example, the plurality of vehicle body cross members 26** are made of a sheet metal and/or composite material (e.g., steel, aluminum, carbon fiber, and/or the like).

Figure 5:
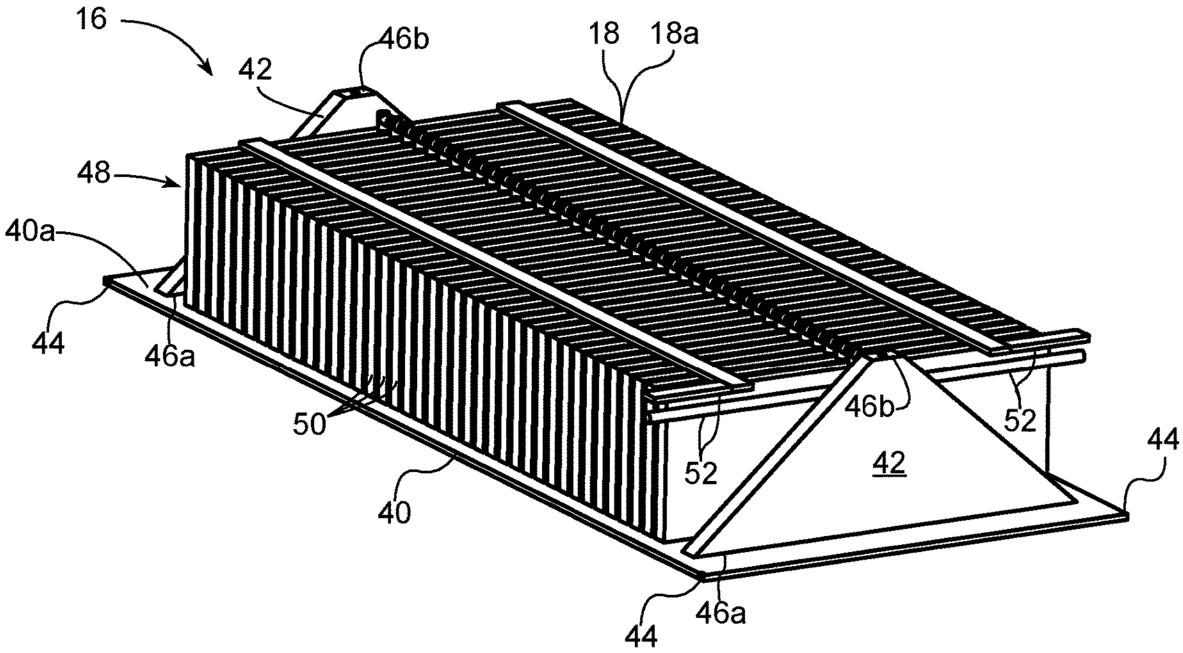
FIG. 5 is a perspective view of a mounting module with a first exemplary battery system component, according to an exemplary embodiment.

Referring to FIG. 5, a perspective view of the mounting module 16 with a first exemplary battery system component **18*a* is shown. The mounting module 16 is used to contain the battery system component 18 (e.g., the first exemplary battery system component 18*a*) and affix the battery system component 18 to the vehicle body 14. In an exemplary embodiment, the mounting module 16 includes a mounting plate 40 and a mounting plate hanger 42. In an exemplary embodiment, the mounting plate 40 has at least a first surface 40*a* and one or more attachment features 44. The one or more attachment features 44 are configured to be attached to the second end 30*b* of the vehicle body cross members 26 using the fasteners 22. In an exemplary embodiment, the one or more attachment features 44 are through-holes or threaded holes in at least the first surface 40*a* of the mounting plate 40 disposed proximally to one or more edges or corners of the mounting plate 40. It should be understood that the quantity, size, shape, and location of the one or more attachment features 44 shown in FIG. 5 are merely exemplary in nature, and that FIG. 5 is not necessarily to scale. In a non-limiting example, the mounting plate 40** is made of a sheet metal and/or composite material (e.g., steel, aluminum, carbon fiber, and/or the like).

The mounting plate hanger 42 is used to provide additional structural support and affixture of the mounting plate 40 to the vehicle body 14. In an exemplary embodiment, the mounting plate hanger 42 has at least a first end **46*a* and a second end 46*b*. The first end 46*a* of the mounting plate hanger 42 is affixed to the first surface 40*a* of the mounting plate 40. In a non-limiting example, the first end 46*a* is welded to the first surface 40*a* of the mounting plate 40. In another non-limiting example, the first end 46*a* is affixed to the first surface 40*a* of the mounting plate 40 with fasteners. The second end 46*b* of the mounting plate hanger 42 includes a through-hole, a threaded hole, a captive nut, and/or the like for removable affixture of the second end 46*b* to the second surface 24*b* of the vehicle body floor pan 24 using fasteners 22. In an exemplary embodiment, the mounting plate hanger 42 is a rigid support member made of a metal and/or composite material (e.g., steel, aluminum, carbon fiber, and/or the like) sheet, extrusion, tube, box, and/or the like. In a non-limiting example, the mounting plate hanger 42 is a trapezoidal shaped rigid support member. In an exemplary embodiment, one or more mounting plate hangers 42 are affixed proximally to one or more edges of the mounting plate 40. It should be understood that the quantity, size, shape, and location of the mounting plate hangers 42 shown in FIG. 5 are merely exemplary in nature, and that FIG. 5 is not necessarily to scale. In some embodiments, additional mounting plate hangers 42 are included depending on the needs of a particular application, battery system component 18**, and/or the like.

With continued reference to FIG. 5, the first exemplary battery system component **18*a* is shown with the mounting module 16. In an exemplary embodiment, the first exemplary battery system component 18*a* includes a battery module 48 including one or more battery cells 50. In a non-limiting example, the battery module 48 stores and provides electrical energy in the form of direct current (DC). In an exemplary embodiment, the one or more battery cells 50 (e.g., lithium-ion battery cells) are electrically connected in series and/or parallel to provide an increased voltage and/or current-carrying capacity. It should be understood that the one or more battery cells 50** may include any chemistry and form-factor of battery cells, including, for example, cylindrical battery cells.

The first exemplary battery system component **18*a* further includes one or more electrical or fluid conductors 52 for interconnection (i.e., electrical and/or fluid connection) between adjacent battery system components 18 (as shown in FIG. 3). In a non-limiting example, the one or more electrical or fluid conductors 52 include, for example, electrical bus bars, electrical cables, coolant lines, air ducts, gas venting ducts, and/or the like. The one or more electrical or fluid conductors 52 pass through the one or more penetrations 34 to provide an electrical and/or fluid connection between adjacent battery system components 18. In an exemplary embodiment, the one or more electrical or fluid conductors 52 may be assembled from one or more of the plurality of access ports 28*a*. In another exemplary embodiment, the one or more electrical or fluid conductors 52 may be assembled from the exterior (i.e., an underside) of the vehicle 12. It should be understood that the type, quantity, size, shape, routing, and location of the one or more electrical or fluid conductors 52 are merely exemplary in nature, and that FIG. 5** is not necessarily to scale.

Figure 6:
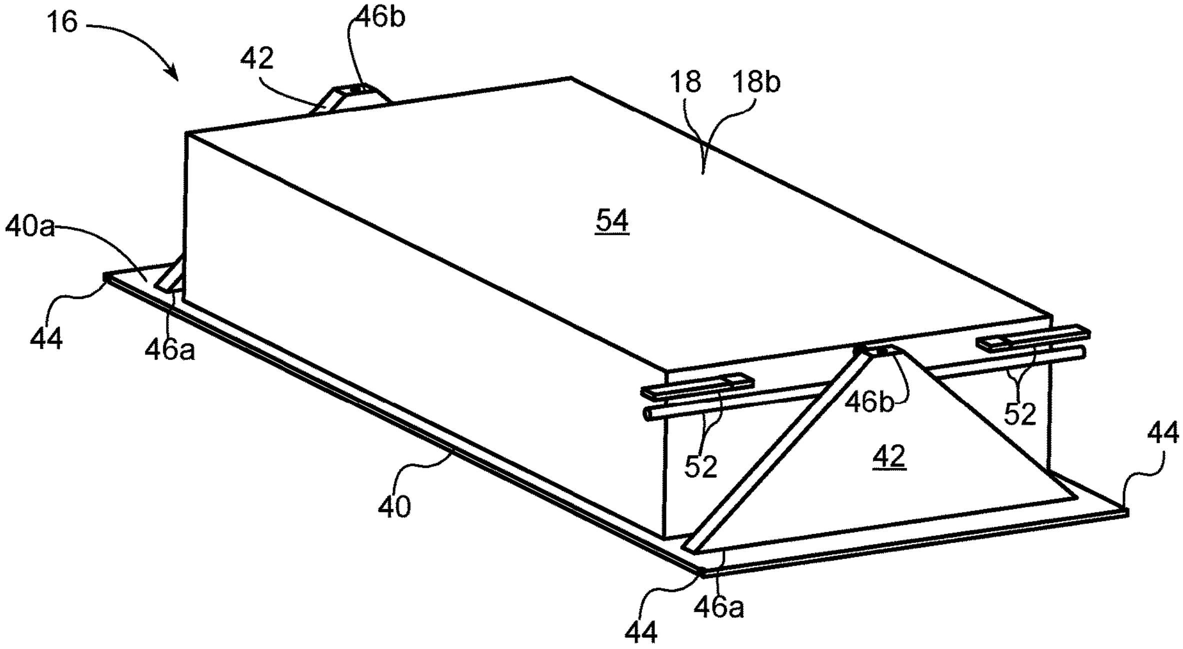
FIG. 6 is a perspective view of a mounting module with a second exemplary battery system component, according to an exemplary embodiment.

Referring to FIG. 6, a perspective view of the mounting module 16 as described above in reference to FIG. 5 is shown with a second exemplary battery system component 18*b*. In an exemplary embodiment, the second exemplary battery system component 18*b* is a battery disconnect unit (BDU) 54.

The BDU 54 is used to control the connection and disconnection of one or more battery modules 48 to other systems of the vehicle 12. In an exemplary embodiment, the BDU 54 includes a BDU controller, a BDU sensor, and a BDU switch. In a non-limiting example, the BDU controller uses the BDU sensor to monitor battery system metrics (e.g., voltage, current, temperature, and/or the like) and detect adverse conditions (e.g., overvoltage or overcurrent conditions, thermal runaway, and/or the like). In response to detecting adverse conditions, the BDU controller actuates the BDU switch to isolate the battery system from other systems of the vehicle 12. In another non-limiting example, the BDU controller receives input from an external device (e.g., an emergency shutoff switch, a wired/wireless interface, and/or the like) and actuates the BDU switch to isolate the battery system based at least in part on the input from the external device.

The second exemplary battery system component 18*b* further includes the one or more electrical or fluid conductors 52 for interconnection (i.e., electrical and/or fluid connection) between adjacent battery system components 18. In a non-limiting example, the one or more electrical or fluid conductors 52 include, for example, electrical bus bars, electrical cables, coolant lines, air ducts, gas venting ducts, and/or the like. The one or more electrical or fluid conductors 52 pass through the one or more penetrations 34 to provide an electrical and/or fluid connection between adjacent battery system components 18. It should be understood that the type, quantity, size, shape, routing, and location of the one or more electrical or fluid conductors 52 are merely exemplary in nature, and that FIG. 6 is not necessarily to scale.

Figure 7:
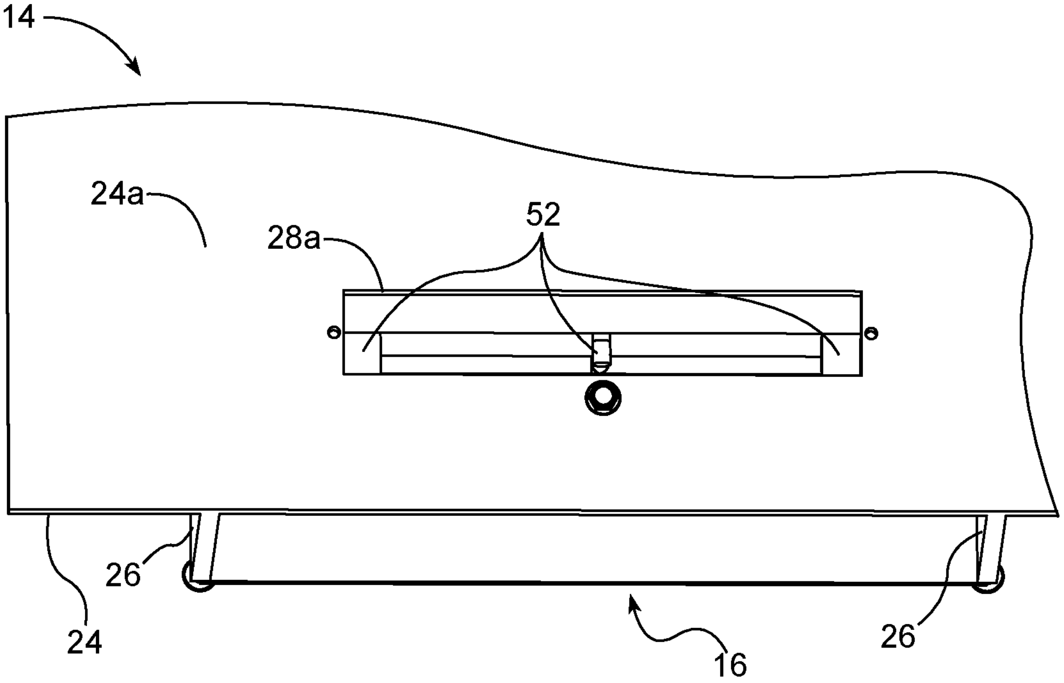
FIG. 7 is a top-down perspective view of a portion of the system for affixing a battery system component to a vehicle, according to an exemplary embodiment.

Referring to FIG. 7, a top perspective view of a portion of the floor pan 24 is shown. The top perspective view is shown with the access panel 28*b* removed, illustrating access to the one or more electrical or fluid conductors 52 through the access port 28*a*. The one or more electrical or fluid conductors 52 may be accessed using the access port 28*a* for service, maintenance, testing, assembly/disassembly, and/or the like.

Referring again to FIGS. 2-6, in the scope of the present disclosure, the battery system component 18 is any component of an electrical system of the vehicle 12, and more particularly, any component of an energy storage system of the vehicle 12. Two examples of battery system components 18 are discussed above in reference to FIGS. 5 and 6 (i.e., the first exemplary battery system component 18*a* and the second exemplary battery system component 18*b*). In general, the battery system component 18 may include any component of the electrical system of the vehicle 12, including but not limited to: battery modules, battery cells, BDUs, power electronics (e.g., fuses, contactors, converters, inverters, etc.), battery management systems (BMS), battery cooling system components (e.g., pumps, hoses, radiators, coolant reservoirs, etc.), battery heating system components, battery safety system components (e.g., fire suppression equipment, thermal runaway prevention/mitigation equipment, etc.), and/or the like. The battery system component 18 is affixed to the first surface 40*a* of the mounting plate 40. In a non-limiting example, the battery system component 18 is affixed to the mounting plate 40 using one or more brackets, fasteners, and/or the like.

Figure 8:
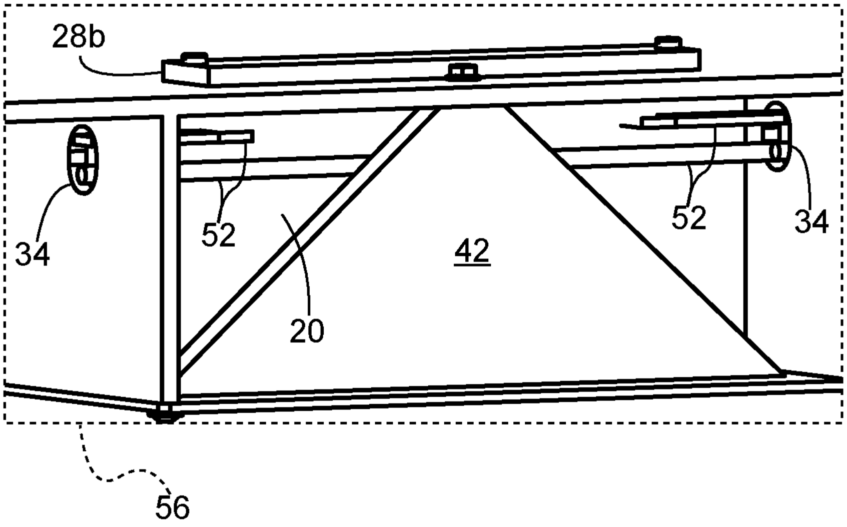
FIG. 8 is a magnified view of the assembled perspective view of FIG. 3, according to an exemplary embodiment.

Referring to FIG. 8, a magnified view 56 of the assembled perspective view of FIG. 3 is shown. Referring again to FIGS. 2-3 and 8, the liner 20 is used to isolate the battery system component 18 and/or the mounting module 16 from the vehicle body 14 and contain and/or direct gases vented from the battery system component 18. The liner 20 is configured to provide one or more of: electrical, thermal, chemical, environmental, and physical isolation and/or protection of the battery system component 18. In an exemplary embodiment, the liner 20 is disposed over the battery system component 18, providing a barrier between the battery system component 18 and the vehicle body 14 when the system 10 is assembled. In another exemplary embodiment, the liner 20 is a coating which is disposed on the second surface 24*b* of the vehicle body floor pan 24 and one or more surfaces of the plurality of vehicle body cross members 26. In some examples, the liner 20 includes penetrations for the one or more electrical or fluid conductors 52 and/or the plurality of access ports 28*a*. In a non-limiting example, the liner 20 is a blow-molded polymer structure. In another non-limiting example, the liner 20 is a curable coating which adheres to the vehicle body 14 and cures after application to the vehicle body 14. It should be understood that the size, shape, and location of the liner 20 are merely exemplary in nature.

The system 10 and mounting module 16 of the present disclosure offer several advantages. By utilizing existing vehicle structure such as the vehicle body 14, to provide structure for the battery system components 18, the need for additional material and thus added weight due to structural components is reduced. Furthermore, by providing the mounting module 16 as a modular apparatus, installation and maintenance may be performed on individual mounting modules 16, reducing the need for handling of large and/or heavy components. The access ports 28*a* and access panels 28*b* allow for servicing of electrical or fluid conductors 52 without removal of mounting modules 16. The liner 20 isolates and protects the battery system components 18. Due to the modular design of the system 10, the present disclosure is adaptable, scalable, and applicable for use with many types of battery system components and many vehicle body designs. For example, the system 10 may be scaled to provide a specific amount of battery system energy storage based on vehicle size, customer needs, and/or the like. Furthermore, the system 10 is adaptable for use with various current and future battery chemistries and power system technologies and topologies.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An apparatus for affixing a battery system component to a vehicle, the apparatus comprising:

a mounting plate configured to be removably affixed to the vehicle, wherein the battery system component is affixed to the mounting plate;

a mounting plate hanger affixed to the mounting plate, wherein the mounting plate hanger is configured to be removably affixed to the vehicle; and a liner disposed between the battery system component and the vehicle, wherein the liner is configured to isolate the battery system component from the vehicle.

2. The apparatus of claim 1, wherein the mounting plate further comprises:

one or more attachment features configured to be affixed to the vehicle using a removable fastener.

3. The apparatus of claim 2, wherein the one or more attachment features are affixed to a vehicle body cross member of the vehicle using the removable fastener.

4. The apparatus of claim 1, wherein the battery system component further comprises:

a battery module including one or more battery cells.

5. The apparatus of claim 1, wherein the battery system component further comprises:

a battery disconnect unit (BDU).

6. The apparatus of claim 1, wherein the mounting plate hanger further comprises:

a rigid support member affixed to the mounting plate and removably affixed to the vehicle.

7. The apparatus of claim 6, wherein the rigid support member further comprises:

a first end affixed to the mounting plate; and a second end affixed to the vehicle using a removable fastener, wherein the second end is opposite the first end.

8. The apparatus of claim 7, wherein the rigid support member further comprises:

a trapezoidal rigid support member, wherein the first end of the trapezoidal rigid support member is affixed to the mounting plate and the second end of the trapezoidal rigid support member is affixed to a vehicle body floor pan of the vehicle using a removable fastener.

9. The apparatus of claim 8, wherein the vehicle body floor pan further comprises:

an access panel providing access to the battery system component.

10. A system for affixing a battery system component to a vehicle, the system comprising:

a vehicle body including:

a vehicle body floor pan having a first surface and a second surface, wherein the first surface is parallel to the second surface; and a plurality of vehicle body cross members, each of the plurality of vehicle body cross members having a first end, a second end, and a first surface, and wherein the first end of each of the plurality of the vehicle body cross members is affixed to the second surface of the vehicle body floor pan such that the first surface of each of the plurality of vehicle body cross members is substantially perpendicular to the second surface of the vehicle body floor pan;

a mounting module removably affixed between two of the plurality of vehicle body cross members, the mounting module including:

a mounting plate having a first surface; and a mounting plate hanger having a first end and a second end, wherein the first end is affixed to the first surface of the mounting plate, and wherein the second end is configured to be removably affixed to the second surface of the vehicle body floor pan; and the battery system component affixed to the first surface of the mounting plate.

11. The system of claim 10, wherein each of the plurality of vehicle body cross members further comprises:

one or more penetrations in the first surface of each of the plurality of vehicle body cross members, wherein each of the one or more penetrations allows for passage of one or more electrical or fluid conductors for electrical or fluid connection to the battery system component.

12. The system of claim 11, wherein the vehicle body floor pan further comprises:

one or more access panels disposed on the first surface of the vehicle body floor pan, wherein the one or more access panels provide access to the one or more electrical or fluid conductors.

13. The system of claim 10, wherein the mounting plate further comprises:

one or more attachment features configured to be affixed to the second end of one or more of the plurality of vehicle body cross members using removable fasteners.

14. The system of claim 10, wherein the mounting plate hanger further comprises:

a trapezoidal rigid support member, wherein a first end of the trapezoidal rigid support member is affixed to the first surface of the mounting plate and a second end of the trapezoidal rigid support member is affixed to the second surface of the vehicle body floor pan using a removable fastener.

15. The system of claim 10, wherein the battery system component further comprises:

at least one of: (i) a battery module, wherein the battery module includes one or more battery cells, and (ii) a battery disconnect unit (BDU).

16. The system of claim 10, further comprising:

a liner disposed between the battery system component and the vehicle body, wherein the liner is configured to isolate the battery system component from the vehicle body.

17. An apparatus for affixing a battery system component to a vehicle, the apparatus comprising:

a mounting module including:

a mounting plate having a first surface, wherein the battery system component is affixed to the first surface; and a mounting plate hanger having a first end and a second end, wherein the first end is affixed to the first surface of the mounting plate, and wherein the second end is configured to be removably affixed to a vehicle body floor pan, wherein the mounting plate hanger further comprises:

a trapezoidal rigid support member, wherein a first end of the trapezoidal rigid support member is affixed to the first surface of the mounting plate and a second end of the trapezoidal rigid support member is affixed to the vehicle body floor pan using a removable fastener.

18. The apparatus of claim 17, wherein the mounting module further comprises:

at least two mounting plate hangers affixed to the first surface of the mounting plate, wherein the battery system component is disposed between the at least two mounting plate hangers on the first surface of the mounting plate.

* * * * *